June 15, 1943.  H. J. PETERSON  2,321,617
MOUSE TRAP
Filed Nov. 21, 1941

Inventor
Henry J. Peterson
by Owing & Hague Attys

Patented June 15, 1943

2,321,617

UNITED STATES PATENT OFFICE 2,321,617

MOUSETRAP

Henry J. Peterson, Webster City, Iowa

Application November 21, 1941, Serial No. 419,927

5 Claims. (Cl. 43—83.5)

The object of my invention is to provide a mouse trap made of metal, for sanitary reasons, and in which while setting the trap the bait holding trigger and the trigger latch are held in positions for automatic latching when the jaw is depressed, without the necessity of being guided or touched by the operator's fingers, thereby avoiding danger of accident.

More specifically, it is my object to provide a trigger latch having a latch setting arm for co-operation with the handle member of the trap jaw, by which as the latch approaches setting position the latch setting arm is firmly engaged and held in proper position for engagement with the trigger, and when the handle is moved to setting position, the latch is freed from frictional engagement with the jaw handle so that it may freely adjust itself to such position of engagement with the trigger that slight jaws to the trap, such as frequently occur when handling and placing in position a baited and set trap, will not release the trigger.

A further object is to provide a combined bait holder and trigger having such degree of radial movement on its supporting shaft that when it has been depressed by the latch when setting the trap, the entire bait holder and trigger may move upwardly far enough to permit the jaw handle member to be moved upwardly with it far enough to release the latch setting arm from engagement with the jaw handle, and whereby when the jaw handle is fully depressed, the trigger is freely movable on its supporting shaft, both longitudinally and laterally, whereby when the trigger latch moves upwardly and engages and applies pressure to the trigger, the latter will automatically assume such position relative to the trigger latch as will establish a relatively firm contact, to avoid said accidental trigger release.

In the accompanying drawing—

Figure 2:
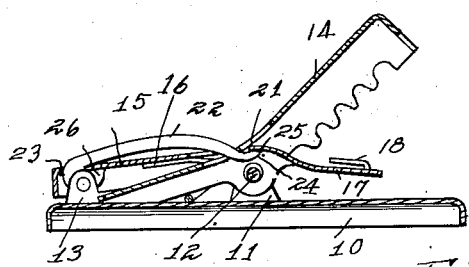
Figure 2 shows a longitudinal sectional view of same in open position.
Figure 1:
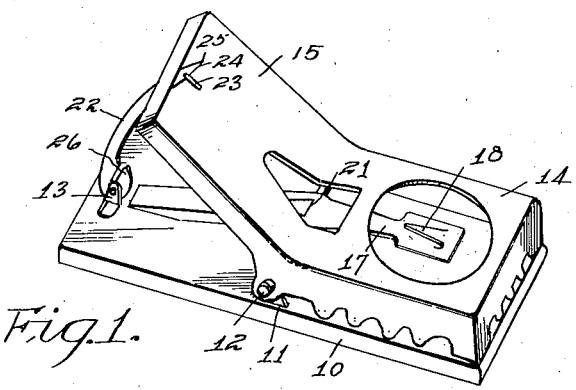
Figure 1 shows a perspective view of my improved trap in closed position.

The reference numeral 10 indicates the base having upwardly extended lugs 11 for the shaft 12, and also lugs 13 for the trigger latch. The jaw 14 has a handle member 15 and is pivoted centrally to the shaft 12. A spring 16 on the shaft 12 urges the jaw to closed position. The central portion of the spring engages the top surface of the base, and its end portions engage the under surface of the movable jaw, hence, the spring also urges the jaw member upwardly on its bearing in the shaft.

In this connection, and to provide for easy and convenient assembly and dis-assembly of the shaft, the spring, the trigger and the jaw, I have formed in the lugs 11, openings to receive the shaft 12 substantially larger than the diameter of the shaft, and in the shaft I have provided annular notches 12a, properly positioned to receive the lugs 11 when assembled. The spring holds the jaw and handle upwardly so that the edges of the lugs at the tops of the openings enter said notches in the shaft to thereby securely hold the shaft against longitudinal movement. When assembling the trap the shaft may be easily and quickly forced into position until the lugs spring into the said notches, and when taking the shaft out, the operator need only press downwardly upon the jaw member, whereupon the shaft moves downwardly relative to the lugs and the grooves of the shaft stand below the parts of the lugs which were in the grooves, hence the shaft is easily removed.

The combined bait holder and trigger member comprises a body portion 17 having a bait hook 18 at one end. Its sides at 19 extend downwardly and have relatively large openings 20 through which the shaft 12 is passed to thereby provide for movement of the trigger both longitudinally and vertically relative to the shaft. The opposite end of the trigger normally rests upon the top surface of the base. At the central portion of the trigger above the shaft 12 is an opening to receive the trigger latch which engages the edge member 21.

The trigger latch comprises a body portion 22 pivoted to the lugs 13, and is extended through a slot 23 in the jaw handle member. Its free end has its lower edge curved upwardly at 24, and at its top is a small upwardly extended lug 25.

Figure 3:
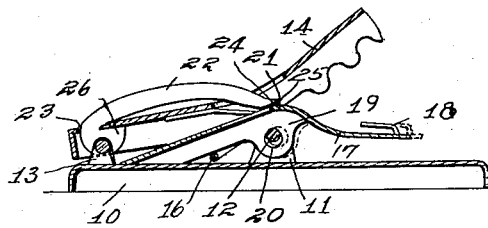
Figure 3 shows a detail sectional view showing the trigger latch in the position it would assume when approaching latching engagement with the trigger.
Figure 4:
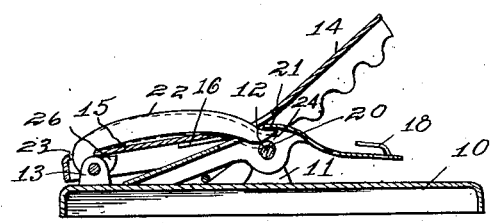
Figure 4 shows a similar view showing the relative positions of the trigger and the latch when the jaw handle is fully depressed.
Figure 5:
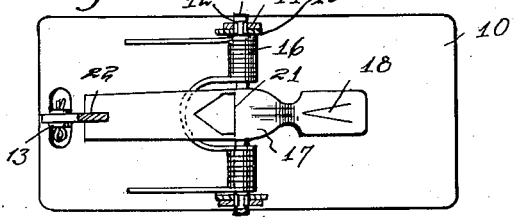
Figure 5 shows a top view of the bait holder and trigger.

At the pivoted end of the latch is a latch setting arm 26, formed integral with the latch and having its upper edge slightly spaced apart from the lower edge of the latch and parallel therewith. The latch is so shaped and proportioned that in all positions of the jaw handle movement the latch is in the slot 23 so that it cannot assume an inoperative position. As the jaw handle approaches setting position the under surface thereof just in front of the slot 23 will engage the upper outer edge of the latch setting arm. Because the arm is very short, the free outer end of the latch is moved to trigger engaging position by a slight movement of the jaw handle. When the part 24 of the trigger latch engages the trigger edge 21 it will tilt the trigger downwardly and may move it forwardly, as shown by dotted lines in Fig. 3, until the end 25 of the latch passes in the rear of and below the edge 21, then the spring raises the latch and trigger to the position shown in Fig. 4. When the parts are in this position the handle member 15 may be tilted up and down a slight distance. When said handle is down, the latch arm 26 is not engaged by the handle member 15 and is free for limited movement on its pivot, but when raised slightly the arm 26 is in engagement with the handle, and during such movement the latch end 25 remains under the trigger edge 21. During such limited up and down movement of the free end of the member 22, said end moves from position engaging the trigger edge 21 to a lower position out of such engagement, as shown by dotted lines in Fig. 4. Hence, in one position of such movement the latch is free from all frictional engagement with the jaw handle or the trigger, and the trigger is movable on its shaft, both longitudinally and in a laterally tilted direction. When the operator releases pressure from the jaw handle the tip of the latch engages the trigger and both move upwardly a short distance, and during this movement they are free to adjust themselves relative to each other and establish a relatively firm frictional engagement, before the full force of the spring is applied. By this means, when the trap is set, it will not be accidentally sprung by slight jars as when handling and placing it in position for use, and yet it may be sprung by an application of slight pressure to the trigger.

I claim as my invention:

1. A mouse trap, comprising a base, a combined jaw and handle member pivoted to the base, a spring for urging the jaw toward the base, a combined trigger and bait holder pivotally supported and capable of limited movement toward and from the base at its pivotal center, a latch pivoted to the base and having a latch operating arm near its pivotal center and shaped to engage the under surface of the jaw handle member when the latter is fully depressed, and at the same time to hold the free end of the latch in position under that part of the trigger which is engaged by the latch, the trigger and bait holder having such degree of movement toward and from the base that when the latch is under the trigger the jaw handle may be moved upwardly by the spring to position out of engagement with the latch setting arm, leaving the latch free of frictional engagement with any part of the jaw handle or the trigger and whereby as the latch approaches setting position relative to the trigger, the outer end is free to adjust itself into firmly engaging position relative to the trigger.

2. A mouse trap, comprising a base, a combined jaw and handle member pivoted to the base, a spring for urging the jaw toward the base, a combined trigger and bait holder pivotally supported and capable of limited movement toward and from the base at its pivotal center, a latch pivoted to the base and having a latch operating arm near its pivotal center and shaped to engage the under surface of the jaw handle member when the latter is fully depressed, and at the same time to hold the free end of the latch in position under that part of the trigger which is engaged by the latch, the trigger and bait holder having such degree of movement toward and from the base that when the latch is under the trigger the jaw handle may be moved upwardly by the spring to position out of engagement with the latch setting arm, leaving the latch free of frictional engagement with any part of the jaw handle or the trigger and whereby as the latch approaches setting position relative to the trigger, the outer end is free to adjust itself into firmly engaging position relative to the trigger, said jaw handle being formed with a slot to guide the latch to position for having its said latch arm engaged by the under surface of the handle member when the latter approaches its downward limit of movement.

3. A mouse trap, comprising a metal base having upstanding lugs, a combined jaw and handle member, a shaft extended through openings in said lugs and through a part of the jaw and handle member, a trigger pivoted to the shaft, a latch for the trigger, a spring on the shaft for operating the jaw and for urging the jaw and handle members upwardly from the base, said shaft being formed with annular grooves near its ends shaped to receive the edges of the lugs at the points where the shaft passes through the lugs, and whereby the upward spring pressure upon the jaw and handle member holds the shaft against longitudinal movement, and whereby when the jaw and handle member is forced downwardly, the shaft may be easily moved longitudinally.

4. A mouse trap, comprising a metal base having upstanding lugs at its central portion and upstanding lugs at one end, a combined jaw and handle member having lugs to cooperate with said centrally arranged lugs, a shaft extended through said lugs, a combined bait holder and trigger mounted on the central portion of said shaft, the openings for the shaft being substantially larger than the diameter of the shaft to permit a longitudinal and also a lateral tilting movement of the trigger, a spring mounted on the shaft for urging the jaw to closed position, a trigger latch loosely pivoted to the lugs at one end of the base, said handle member being formed with a slot through which the free end of the trigger latch is extended, a latch moving arm formed integral with the latch near the pivotal point and having an upper edge portion spaced below and substantially parallel with the adjacent lower edge of the latch, the amount of movement of the trigger on its shaft and the amount of movement permitted the handle member between the latch arm and the latch being such that when the handle member is depressed and the latch is under the trigger, both the latch and trigger are free to adjust themselves to cooperating latching position, and when the handle member is released, the trigger may be moved bodily upwardly until the latch-setting arm is free from engagement with the handle.

5. A mouse trap, comprising a base, a combined jaw and handle member pivoted to the base, a spring for urging the jaw toward the base, a combined trigger and bait holder pivotally supported and capable of limited movement toward and from the base at its pivotal center, a latch pivoted to the base and having a latch operating arm near its pivotal center and shaped to engage the under surface of the jaw handle member when the latter is depressed, and at the same time to hold the free end of the latch in position under that part of the trigger which is engaged by the latch.

HENRY J. PETERSON.